Figure 1:
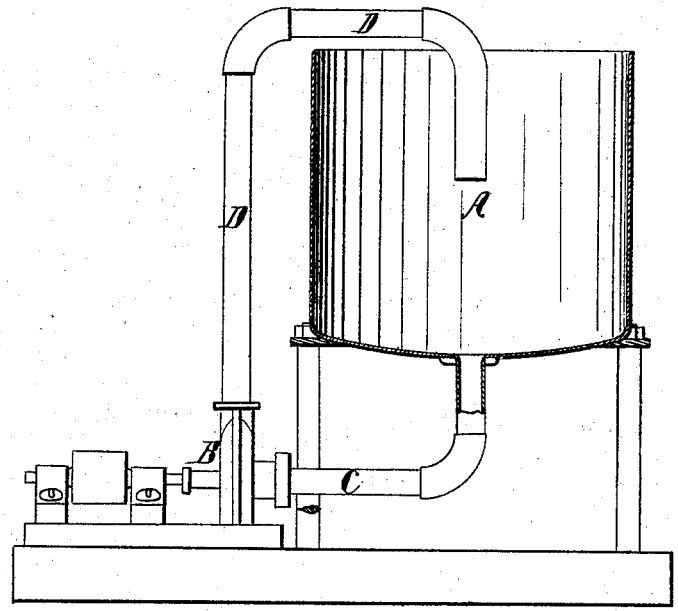
Figure 2:
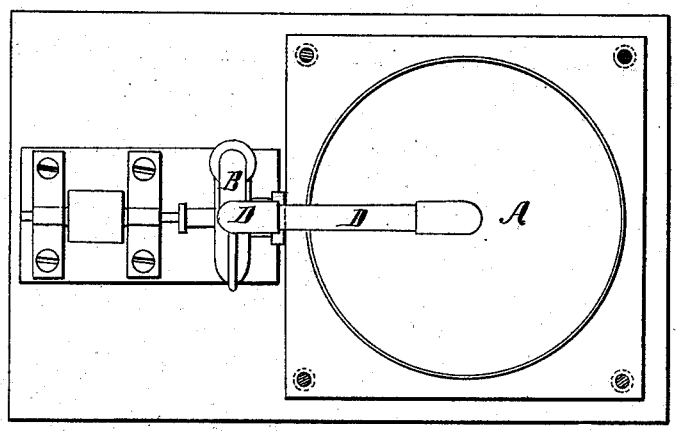

C. T. TOMKINS.
Preparing Gypsum for Use in Paper-Making and
Other Purposes.

No. 211,066. Patented Dec. 17, 1878.

Witnesses:
Frank H. Stone
A. K. Eaton

Inventor:
C. T. Tomkins

UNITED STATES PATENT OFFICE.

CORNELIUS T. TOMKINS, OF HILLSBOROUGH, NEW BRUNSWICK, CANADA.

IMPROVEMENT IN PREPARING GYPSUM FOR USE IN PAPER-MAKING AND OTHER PURPOSES.

Specification forming part of Letters Patent No. 211,066, dated December 17, 1878; application filed March 15, 1878.

*To all whom it may concern:*

Be it known that I, CORNELIUS T. TOMKINS, of Hillsborough, Canada, have invented an Improved Apparatus for Agitating a Mixture of Dehydrated Gypsum and Water, of which the following is a specification:

My invention consists in effecting a thorough and continuous agitation of a mixture of dehydrated gypsum with about seven times its weight of water, for the purpose of recrystallizing the same, by combining a centrifugal, rotary, or other pump with a capacious reservoir, so as to insure rapid and continuous circulation of the material during treatment.

In my process for the preparation of gypsum for paper-making, &c., patented May 9, 1876, my mixture must be subjected for about forty minutes to thorough and continuous agitation. In order to obtain the best results and secure perfect uniformity in the product, I have found it desirable to make the agitation more violent and continuous than can be done by ordinary stirring, so as to prevent the possibility of any portion of the sulphate of lime settling in the reservoir during the treatment.

This I effect by means of the combination of a rotary or other pump with the reservoir or tank holding the mixture, as shown in the drawing accompanying this specification.

The ground and dehydrated gypsum is introduced into the tank A with an amount of water equal to at least seven times the weight of the gypsum employed. The pump B is immediately put in motion, withdrawing the cream-like mixture rapidly from the tank through the pipe C, and forcing it continuously into the tank again through the discharge-pipe D. The effect of this forced circulation is to keep all the particles effectually suspended in the water until the recrystallization of the sulphate of lime is fully effected, which is the end to be reached in the process.

The result of the treatment to which the gypsum is subjected, as above described, is that the finely-divided native sulphate of lime, which at the commencement of the treatment is an amorphous powder, represented by small fragments of coarse rhomboidal prisms, becomes entirely changed in its crystalline character.

The sulphate of lime is found to have assumed the form of delicate acicular crystals of microscopic minuteness, the average diameter of which is about one-fifteen-thousandth ($\frac{1}{15000}$) of an inch. This crystalline form, which is entirely distinct from that of the original crystals of native gypsum, is, in a remarkable degree, fitted for use in the manufacture of paper or of bleached cotton goods, producing an article of superior hardness, firmness, and opacity.

The crystalline particles produced by this process are more minute and uniform in size than can be obtained by any other means, with the additional advantage that, owing to their acicular or needle-like form, they do not escape through the meshes of the wire-cloth used in paper-machinery.

If we take the ordinary material used in paper manufacture, called "terra alba," which is native gypsum reduced to an impalpable powder, and compare it with this new product by means of the microscope, we find that the former consists of fragmentary portions of rhomboidal prisms, exceedingly variable in size and character. The average diameter of the smaller of these particles is one-five-thousandth ($\frac{1}{5000}$) of an inch. The same material after treatment by this process exhibits under the microscope slender crystals, the great length of which, as compared with their diameter, make them of essential service in the felting or matting together of the fiber employed in the manufacture of paper.

I do not claim, broadly, an apparatus for circulating a fluid continuously through a tank by means of a pump. My object is to improve the article claimed in my former patent above referred to.

I claim—

1. The improved process, herein described, for treating gypsum for use in paper-making, &c., consisting in subjecting it to continuous agitation in a tank with water, and to a continuous circulation, as set forth.

2. As a new article of manufacture, the minutely crystalline form of sulphate of lime, herein described, suitable for use in the manufacture of paper, &c., as set forth.

C. T. TOMKINS.

Witnesses:
A. K. EATON,
FRANK W. STONE.